United States Patent
Baehr-Jones et al.

(10) Patent No.: US 10,345,520 B2
(45) Date of Patent: Jul. 9, 2019

(54) WAVEGUIDE ETCH METHOD FOR MULTI-LAYER OPTICAL DEVICES

(71) Applicant: Elenion Technologies, LLC, New York, NY (US)

(72) Inventors: Thomas Wetteland Baehr-Jones, Arcadia, CA (US); Ruizhi Shi, New York, NY (US)

(73) Assignee: Elenion Technologies, LLC, New York, NY (US)

(*) Notice: Subject to any disclaimer, the term of this patent is extended or adjusted under 35 U.S.C. 154(b) by 3 days.

(21) Appl. No.: 15/621,149

(22) Filed: Jun. 13, 2017

(65) Prior Publication Data

US 2018/0356593 A1 Dec. 13, 2018

(51) Int. Cl.
*G02B 6/136* (2006.01)
*G02B 6/122* (2006.01)
*G02B 6/126* (2006.01)
*G02B 6/12* (2006.01)

(52) U.S. Cl.
CPC ........... *G02B 6/136* (2013.01); *G02B 6/1228* (2013.01); *G02B 2006/12097* (2013.01); *G02B 2006/12152* (2013.01)

(58) Field of Classification Search
CPC .................................. G02B 6/126; G02B 6/136
See application file for complete search history.

(56) References Cited

U.S. PATENT DOCUMENTS

2010/0163521 A1* 7/2010 Balamane ............. G11B 5/314
216/22

* cited by examiner

*Primary Examiner* — Thomas T Pham
(74) *Attorney, Agent, or Firm* — Stratford Managers Corporation

(57) ABSTRACT

An optical device and a method of manufacturing an optical device, including a ridge waveguide second, and a strip-loaded ridge waveguide section, comprises applying two different protective layers and two separate etches at two different depths. The protective layers overlap to protect the same section of the optical device, and to limit the surfaces of optical device to exposure to multiple etches, except at edges where the protective layers overlap.

9 Claims, 9 Drawing Sheets

WAVEGUIDE ETCH METHOD FOR MULTI-LAYER OPTICAL DEVICES

TECHNICAL FIELD

The present invention relates to a multi-layer optical device, and in particular to a method of manufacturing a multi-layer optical device, which attempts to limit the surfaces of the optical device to a single etch step.

BACKGROUND

Challenges occur in the guiding of light from one type of waveguide to another, for example, from a ridge waveguide to a so-called "strip-loaded" ridge waveguide. A ridge waveguide involves an isolated waveguide rectangle, while a strip-loaded ridge waveguide comprises a multi-layer section with at least one fairly thin waveguide contact region connected to one or both sides of a central waveguide rectangle.

A key challenge in waveguide photonics is building waveguides with different depths of strip-loading or ridge waveguides without strip-loading at all, all in the same process. Strip-loading refers to a small connection of waveguide that is left at the edge of a ridge waveguide, typically for electrical contact. The typical approach is to utilize multiple etch steps in series. Different parts of the waveguide are exposed at different times. In locations where deeper or even complete etching surrounding the waveguides is available, the waveguide will usually have been exposed to multiple etches. This leads to "interface effects" on the edge of the waveguide where multiple etch steps have been executed, which can lead to performance problems.

An object of the present invention is to overcome the shortcomings of the prior art by providing a multi-layer optical device and a method of manufacturing a multi-layer optical device, which minimizes locations undergoing multiple etches.

SUMMARY OF THE INVENTION

Accordingly, the present invention relates to a method of manufacturing a multi-layer optical device including a ridge waveguide section comprising waveguide material at an upper level, and a strip-loaded ridge waveguide section comprising portions at an intermediate level and portions at the upper level, the method comprising:

a) providing a substrate with a layer of the waveguide material thereon;

b) applying a first protective shield over a first area of the waveguide material including the portions at the upper level of the strip-loaded ridge waveguide section and the ridge waveguide section;

c) applying a first partial etch over a second area of the waveguide material including the portions at the intermediate level to etch the second area wider than the portions at the intermediate level to define the portions at the upper level of the strip-loaded ridge waveguide section;

d) applying a second protective shield over a third area of the waveguide material covering the portions at the intermediate level to protect them from further etching, and the portion at the upper level of the strip-loaded ridge waveguide section and the ridge waveguide section; and e) applying a second full etch, deeper than the first partial etch, over a fourth area of the waveguide material to define the ridge waveguide section and the portions at the intermediate level of the strip-loaded ridge waveguide section;

wherein the first protective shield overlaps the second protective shield, whereby side surfaces of the strip-loaded ridge waveguide section and the ridge waveguide section are only subject to a single etch, except at intersecting edges where the ridge waveguide section intersects the strip-loaded waveguide section.

Another aspect of the present invention relates to a mode conversion device comprising:

a substrate including an upper surface;

a ridge waveguide section including a first height perpendicular to upper surface of the substrate and a first width parallel to the upper surface of the substrate;

a ridge waveguide expansion section including the first height and an expanding width;

a tapering strip-loaded region comprising a first portion including the first height and a tapering width; and initial side portions, one on each side of the first portion, including a second height, shorter than the first height, and an expanding width; and an expanding strip-loaded region comprising a middle portion including the first height and a constant width; and final side portions including the second height, and an expanding width.

BRIEF DESCRIPTION OF THE DRAWINGS

The invention will be described in greater detail with reference to the accompanying drawings which represent preferred embodiments thereof, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

The present invention relates to a multi-layer optical device and method that addresses the aforementioned challenges. The present invention may achieve several goals, by limiting most surfaces of the optical device and each portion of a hard mask to a single etch, and thereby making the device relatively tolerant to misalignment in the partial etch steps with respect to the hard mask step. Using the approach of the present invention may result in low-loss coupling between ridge and strip-loaded waveguides within waveguide fabrication processes.

Figure 1:
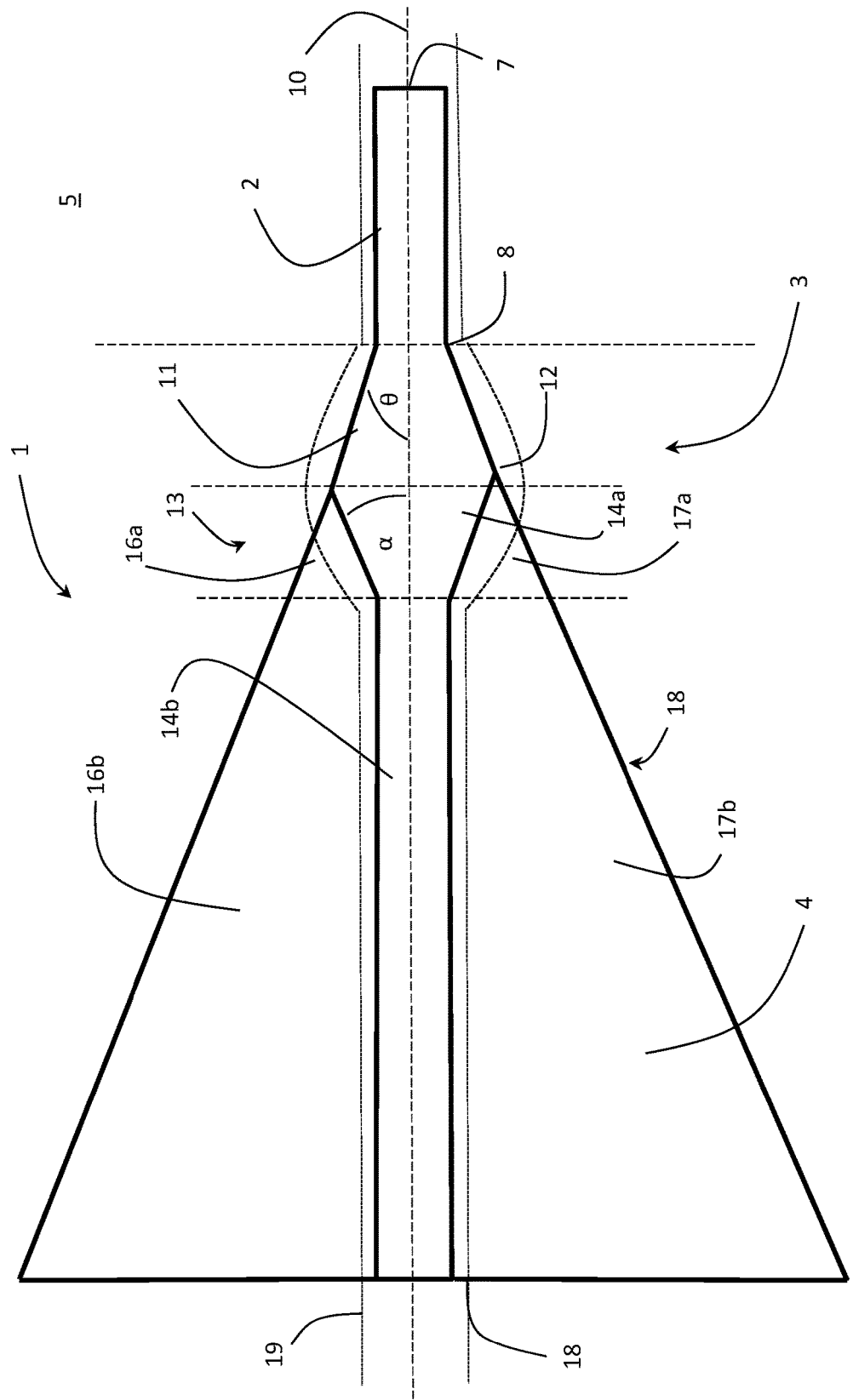
FIG. 1 is a top view of the optical device in accordance with an embodiment of the present invention.

With reference to FIG. 1, the present invention relates to a multi-layer optical device, e.g. a mode converter 1, including a ridge waveguide section 2, and a strip-loaded ridge waveguide section 4, all supported on a substrate 5. The illustrated example also includes an expansion section 3, which is not required for all embodiments. The ridge waveguide section 2 may comprise an elongated rectangular waveguide including a first input/output 7 at an outer free end, and a second input/output 8 proximate the expansion section 3. Ideally, the ridge waveguide section 2 includes an upper surface with a consistent height parallel to the upper surface of the substrate 5, e.g. about 200 nm to 300 nm, and substantially perpendicular edges perpendicular to the upper surface of the substrate 5 with a width of, e.g. about 400 nm to 600 nm, typically capable of sustaining light in a single mode along a longitudinal axis 10 defining a direction of light propagation; however, other shapes, sizes and capabilities are within the scope of the invention.

The expansion section 3 includes a ridge waveguide expansion region 11, which may have the same height as the ridge waveguide section 2, but with a width that expands gradually, e.g. linearly or curved, from the second input/output 8 to an expanded width at a transition point 12. The edge of the expansion section may expand linearly or on average at an expansion angle θ of about 5° to 35°, ideally 10° to 15°, from the longitudinal axis 10. The expanded width may be about twice the original width, e.g. 800 nm to 1200 nm, while still sustaining a single mode. The ridge waveguide expansion region 11 is capable of converting an optical mode when propagating between the ridge waveguide section 2 and the strip-loaded ridge waveguide section 4.

At the transition point 12, the expansion section 3 becomes a first strip-loaded region 13, which comprises a stepped structure, including a tapering middle portion 14a with the same height as the ridge waveguide expansion region 11, and expanding side portions 16a and 17a with a height less than the tapered middle portion 14a, e.g. less than half or about 100 nm to 150 nm. from the upper surface The tapering middle portion 14a may include a width that tapers gradually, e.g. linearly or curved, from the expanded width down to approximately the original width of the ridge waveguide section 2, e.g. 400 nm to 600 nm. The tapering middle portion 14a may taper down to a constant middle portion 14b linearly or on average at a tapering angle α, which may be the same as the expansion angle, e.g. about 20° to 35° from the longitudinal axis 10, or at some other suitable angle.

The expanding side portions 16a and 17a may gradually expand linearly or on average at the same angle as the ridge waveguide expansion region 11. A substantially triangular-shaped area may be formed in the expanding side portions 16a and 17a due to the side portions 16a and 17a expanding while the middle portion 14a taper.

In the strip loaded waveguide section 4, the constant middle portion 14b extends from the tapering middle portion 14a with a constant height and width, e.g. the same as ridge waveguide section 2, symmetrical about the longitudinal axis 10, while final side portions 16b and 17b continue to gradually expand, e.g. at approximately the same expansion angle as the expanding side portions 16a and 16b, to a second input/output 18.

Each of the final side portions 16b and 17b may be 4 to 5 times wider than the final middle portion 14b, e.g. 1600 nm to 3000 nm, with an overall total width of at least 8 times, and preferably 10 times the width of the ridge waveguide section 2, e.g. 3200 nm to 6000 nm.

The index of refraction of the ridge waveguide section 2, the expansion section 3, and the strip-loaded ridge waveguide section 4 is higher than the substrate 5, which provides a lower cladding therefor. The sides and upper portions of the ridge waveguide section 2, the expansion section 3, and the strip-loaded ridge waveguide section 4 may be covered with an upper cladding layer with a lower index of refraction to act as an upper cladding. Alternatively, air may provide the upper cladding. The ridge waveguide section 2, the expansion section 3, and the strip-loaded ridge waveguide section 4 may be comprised of a semiconductor material, e.g. silicon, and the substrate 5 may be comprised of a dielectric material, e.g. silicon dioxide. In a preferred example the substrate 5 and waveguide sections 2, 3 and 4 are formed from a SOI structure, with the waveguide sections 2, 3 and 4 in an upper silicon layer, and the substrate 5 formed of the middle silicon dioxide (BOX) layer and the bottom handle silicon layer. However, other suitable materials may be used for the waveguide sections 2, 3 and 4, and the cladding, e.g. the substrate 5.

Unlike conventional photonics processes, the present invention may utilize more photoresist steps in combination with a single hard mask step, so that ideally any particular substantial waveguide surface may only be exposed to a single etch step in the course of the entire process. Therefore, additional mask steps may be required, but waveguides, where two etches touch the optical surface in the same place, are limited to designated locations, e.g. transition points 12, at which points the mode 19 has been slightly expanded in the horizontal direction to minimize harmful effects on the light. Eliminating multiple etches lowers waveguide loss and improves repeatability.

Figure 2:
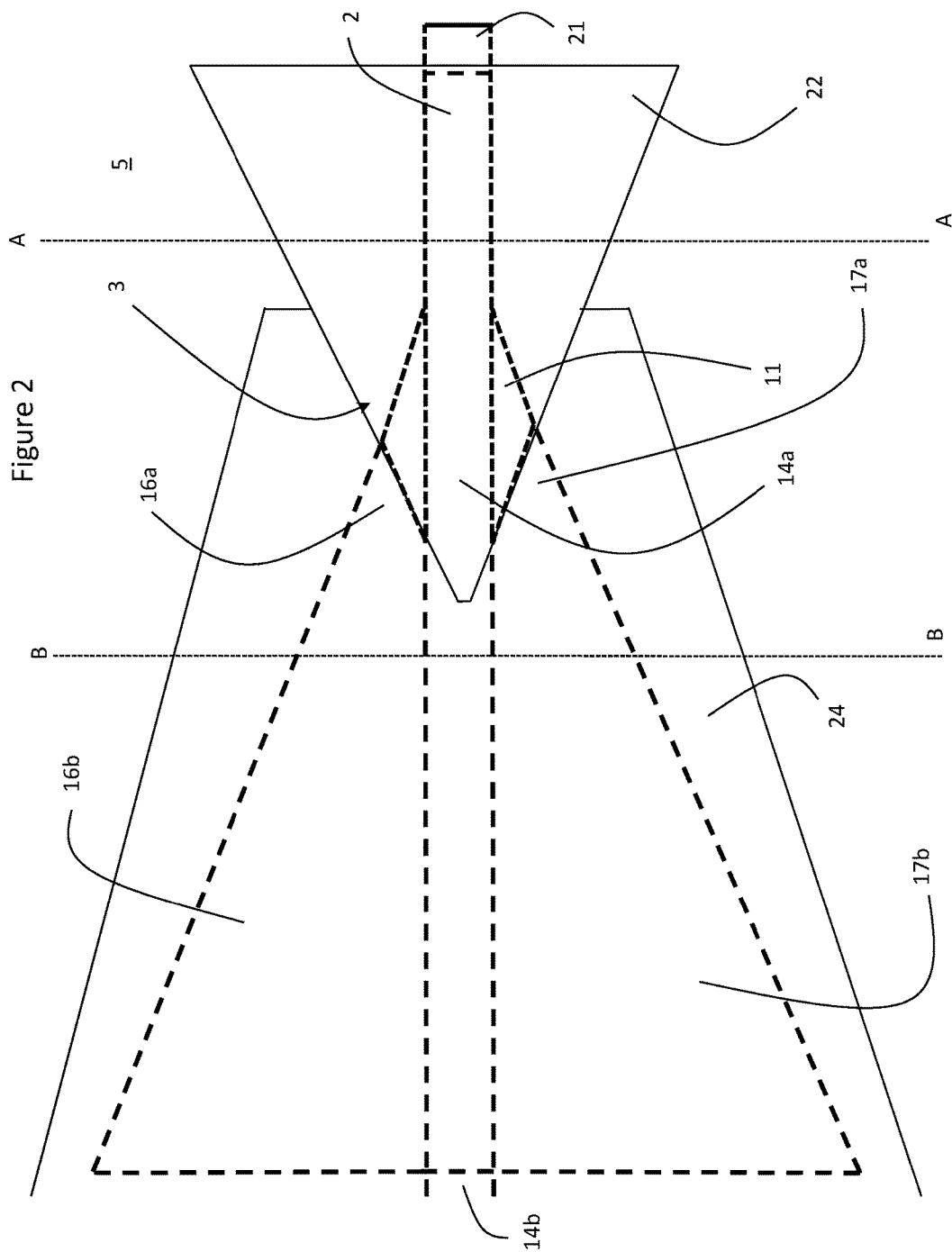
FIG. 2 is a top view of the device of FIG. 1, including a first protective layer and a first etch layer.
Figure 3:
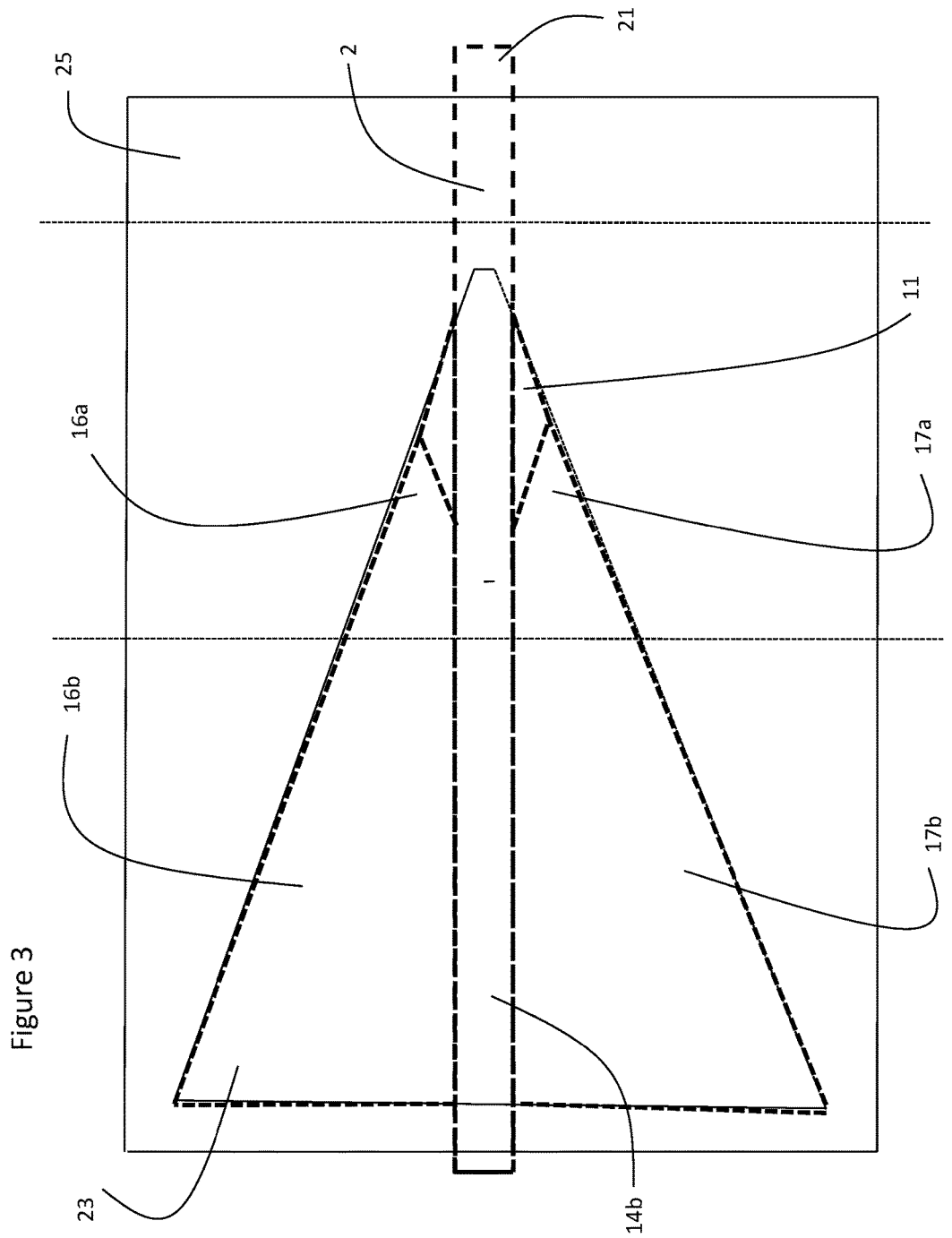
FIG. 3 is a top view of the device of FIG. 1, including a second protective layer and a second etch layer.
Figure 4:
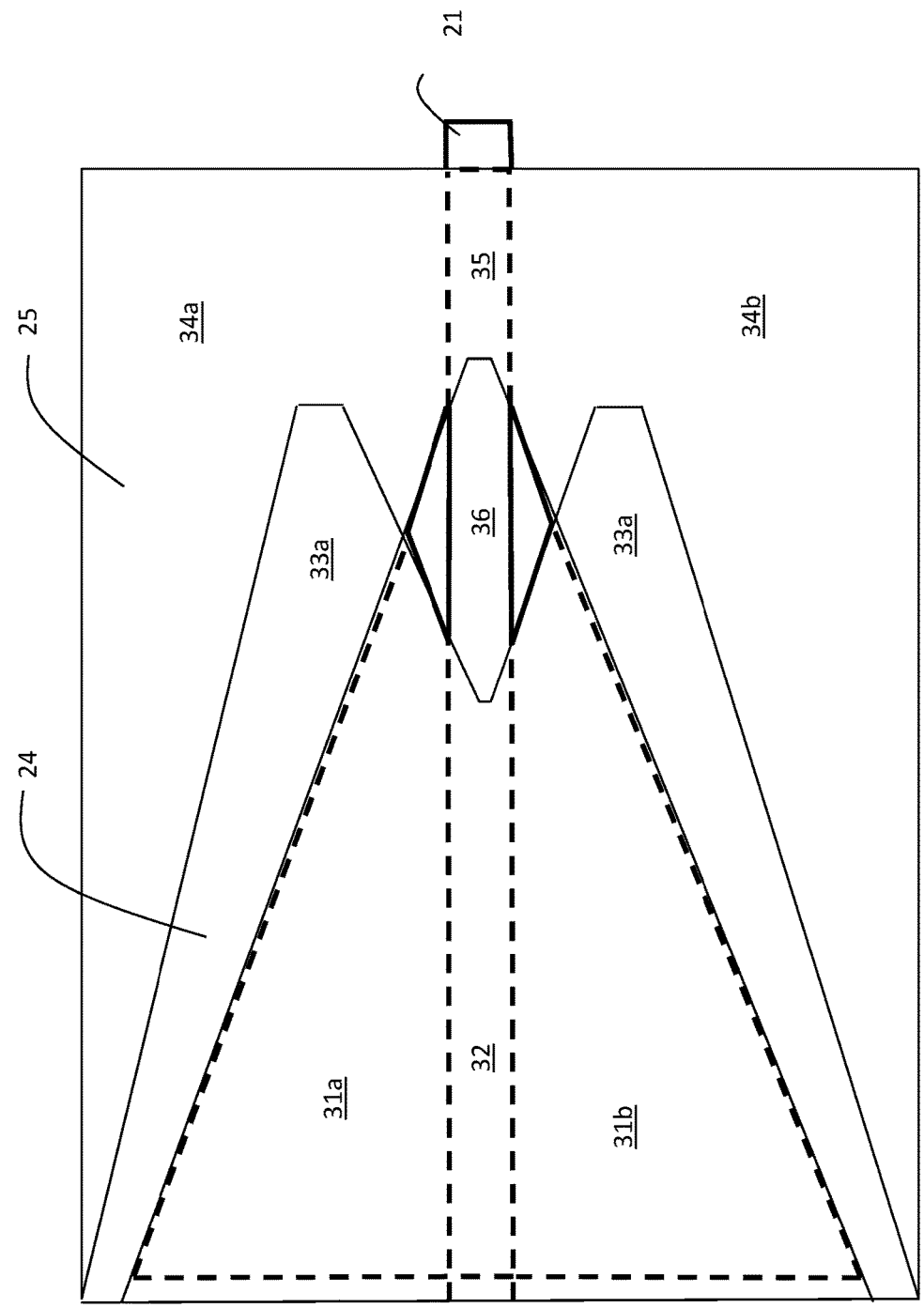
FIG. 4 is a top view of the device of FIG. 1, including the second etch layer overlapping the first etch layer.

With reference to FIGS. 2, 3 and 4, the method of the present invention uses a plurality of different protective layers, for example a first protective shield, comprising one or more of a hard-mask layer 21 and a first photoresist layer 22, and a second protective shield comprising a second photoresist layer 23. The method also includes a plurality of etching layers comprising at least a partial-etch layer 24 and a full-etch layer 25. Additional protective layers and etch layers are possible, as hereinafter described, in particular when additional structures are provided on the substrate 5. Typically, the first protective shield is used to protect features that will not be etched, while the second protective shield protects features, which have already been etched, from further etching.

In the illustrated embodiment, the first and second protective shields both include the hard mask layer 21, which may be comprised of a thin layer of silicon nitride, and is applied at the start of the process, to protect the ridge waveguide section 2 and the constant middle portion 14b of the strip-loaded ridge waveguide section 4 from being etched. Typically, the hard mask layer 21 extends the entire length of the central region of the mode converter 1 across the expansion section 3. Ideally, the hard mask layer 21 includes about the same constant width as the ridge waveguide section 2 and the constant middle portion 14b of the strip-loaded ridge waveguide section 4, e.g. 400 nm to 600 nm, leaving the wider portions of the expansion section 3 and tapered middle portion 14a unprotected.

With reference to FIG. 2, the remainder of the first step comprises placing the rest of the first protective shield, e.g. the first photoresist layer 22, over the ridge waveguide section 2, the expansion region 11, and the tapered middle portion 14a, thereby defining the tapering edges of the tapering middle portion 14a, and protecting the hard mask layer 21 over the ridge waveguide section 2, the expansion region 11, and the tapering middle portion 14a. Accordingly, the first photoresist layer 22 extends outwardly from either side of the hard mask layer 21 at the tapering angle α from the longitudinal axis 10. The first photoresist layer 22 may also cover and protect other elements on the substrate 5. The first photoresist layer 22 protects the parts of the optical device at the upper level not already protected by the hard mask layer 21, in particular parts of the optical device at the upper level transitioning to a part of the optical device at an intermediate level.

The partial-etch layer 24 is then applied over the areas to be partially etched, namely the expanding side portions 16a and 17a and the final side portions 16b and 17b. The partial etch layer 24 also covers the constant middle portion 14b, which is protected by the hard mask 21, but not the ridge waveguide section 2 or the portions of the expansion section 3 at the upper level, which are protected by the first photoresist layer 22. The partial etch layer 24 extends beyond the edges of the final side portions 16b and 17b, i.e. etches an area greater than the final side portions 16b and 17b occupies, whereby the edges of the final side portions 16b and 17b will not be subject to two etching steps, i.e. the partial etch layer 24 and the full etch layer 25, which occurs later, as hereinafter described. The partial etch layer 24 removes the unprotected waveguide material 50 down to the intermediate level, e.g. about half of the waveguide material, more than half, 100 nm to 150 nm, or ideally 130 nm+/−3.5 nm.

With reference to FIG. 3, the next step involves protecting the partially etched sections of the device (mode converter 1), e.g. the expanding side portions 16a and 17a and the final side portions 16b and 17b, and the non-etched sections, e.g. the ridge waveguide section 2, the expansion region 11, and the tapered middle portion 14a with the second protective shield. The majority of the non-etched sections, e.g. the ridge waveguide section 2 and the constant middle portion 14b continue to be protected by the hard mask layer 21 The partially etched sections are protected by being covered by the second photoresist layer 23, which defines the edges of the final side portions 16b and 17b, the outer part of the tapering side portions 16a and 17a, and the expansion region 11. Accordingly, the second photoresist layer 23 extends outwardly from each side of the hard mask 21 at the expansion angle θ from the longitudinal axis 10, from output 8 of the ridge waveguide section 2 to the outer free end 18 of the strip-loaded ridge waveguide section 4.

Next, the fully-etched layer 25 is applied, thereby clearly defining both the partially and fully etched areas, i.e. the outer end 18 and the edges of the final side portions 16b, along with the edges of the ridge waveguide expansion region 11 and the ridge waveguide section 2.

Another aspect of the invention is that each section of the hard mask layer 21 may only be etched with a single etch step when possible. This ensures maximum integrity of the hard mask layer 21 and also ensures that losses and non-uniformities remain at a minimum. Ideally, the partial-etch layer 24 and the full-etch layer 25 are not applied on the same place of the hard mask layer 21, by covering selected portions of the hard mask layer 21 with the first and second photoresist layers 22 and 23 at different times to avoid any chance of removal of the waveguide material, if the hard mask layer 21 is not be thick enough.

FIG. 4 illustrates the partial-etch layer 24 and the full-etch layer 25 overlapping each other, whereby the first and second photoresist layers 22 and 23 are carefully designed to avoid any overlapping of the first and second etch layers 24 and 25 on hard mask layer 21. Moreover, every substantial side surface in the final mode converter device 1 only experiences one of the two etches 24 or 25 to ensure the high quality of the sidewalls. Only two edges of the mode converter device, i.e. where the ridge waveguide expansion region 11 meets the tapering middle portion 14a, and where the first photoresist layer 24 intersects the second photoresist layer 25, undergo multiple etches, and these edges have only minimal effect on the mode, since the mode has been slightly expanded by the ridge waveguide expansion region 11. Areas 31a, 31b, 32, 33a and 33b represent a first area, in which the partial-etch layer 24 is applied. A notch is created between the areas 31a/33a and 31b/33b by the first photoresist layer 22. Areas 31a and 31b represent the final side portions 17a and 17b of the strip-loaded ridge waveguide section 4, area 32 represents the middle portion 14b of the strip-loaded waveguide section 4, and areas 33a and 33b represent excess waveguide material removed subject to both the partial-etch and full etch layers 24 and 25.

Areas 33a, 33b, 34a, 34b, and 35 represent a second area, in which the full-etch layer 25 is applied. A notch is created between the areas 33a/34a and 33b/34b by the second photoresist layer 23. As above, the areas 33a, 33b represent the areas of the waveguide material totally removed by both the first and second full etches 24 and 25, while the areas 34a and 34b represent the areas of the waveguide material totally removed by the only the second full etch 25. The area 35 represents the ridge waveguide section 2, protected by the hard mask layer 21 and the first photomask layer 22 (during the first partial etch 24). Area 36 represents an area of intersection between the ridge waveguide section 2 and the strip-loaded waveguide section 4, and an area of intersection of the first photomask layer 22 and the second photomask layer 23, which covers the parts of the expansion section 3 not subject to either etch step 24 or 25, protected partially by the hard mask layer 21 and fully by the first photomask layer 22 and the second photomask layer 23 in subsequent etching steps. The points of intersection between the first and second photomask layers 22 and 23, respectively, correspond to the transition points 12, at which vertical edges are subject to both the partial and full etch layers 24 and 25, respectively.

Figure 5A:
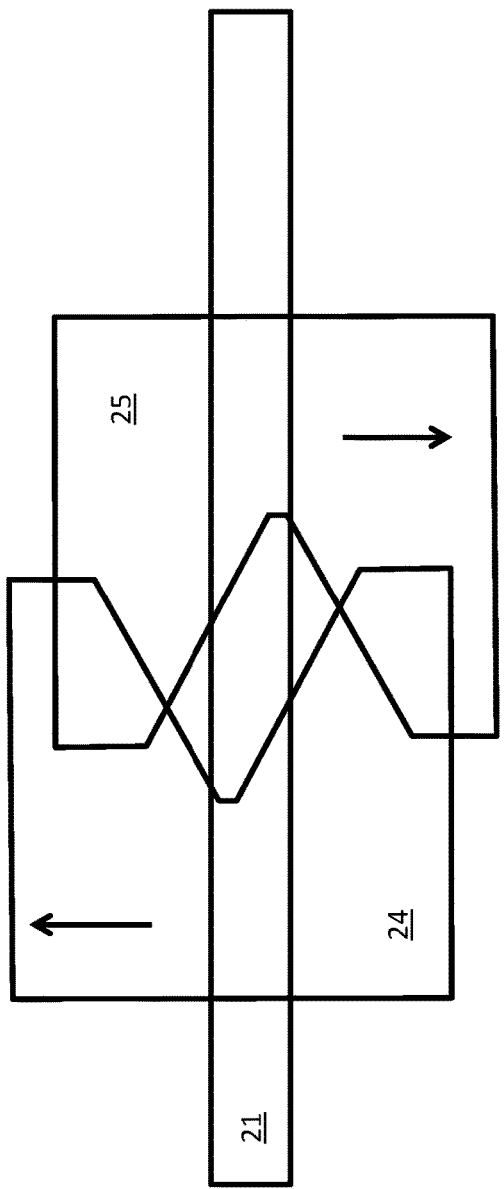
FIGS. 5a and 5b is a top view of the device of FIG. 1, including slight misalignment of the second etch layer overlapping the first etch layer.
Figure 5B:
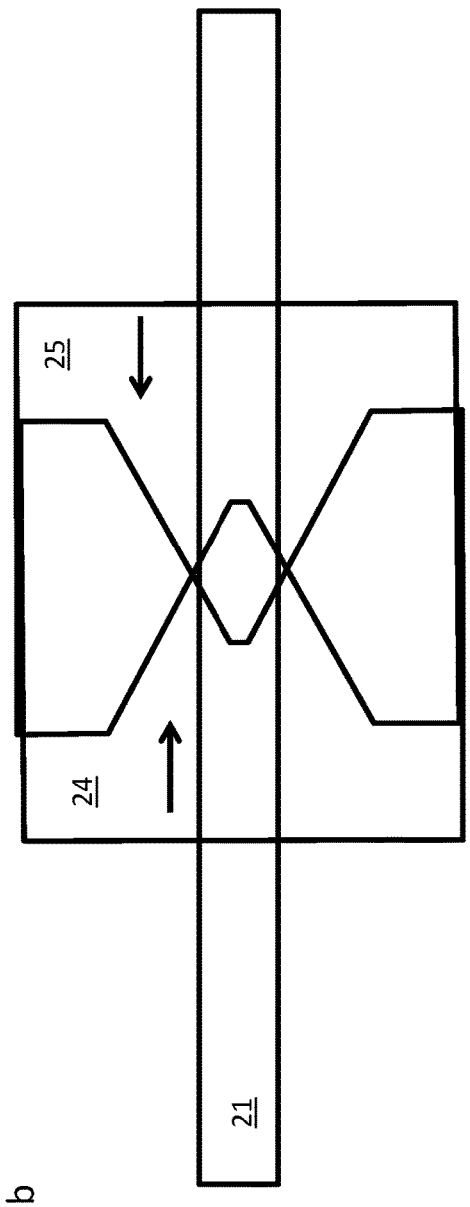

FIGS. 5a and 5b illustrate the overlapping etch layers 24 and 25, as in FIG. 4, but with slight mask misalignment. In FIG. 5a, the partial-etch layer 24 is laterally offset from the full-etch layer 25, with the hard mask layer 21 in place. In FIG. 5b, the partial-etch layer 24 is longitudinally offset from the full-etch layer 25 with the hard mask layer 21 in place. Either way the hard mask layer 21 does not undergo two etch steps at any location, and no surface of the optical device undergoes multiple etch steps only the two aforementioned edges.

Another example of the method of the present invention is illustrated with reference to FIGS. 6a to 9b. FIGS. 6a, 7a, 8a and 9a represent a cross section taken along a front of an optical device, e.g. line A-A in FIGS. 2 and 3, whereas FIGS. 6b, 7b, 8b and 9b represent a cross section taken along a rear of the optical device, e.g. line BB in FIGS. 2 and 3.

Figure 6A:
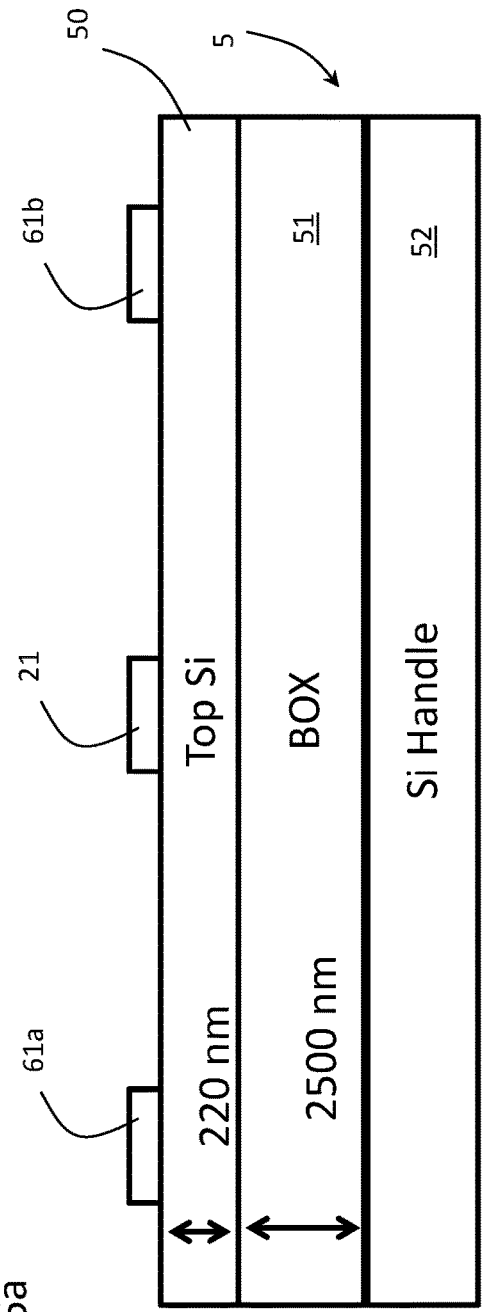
FIGS. 6a and 6b illustrate a first step of an embodiment of the method of the present invention.
Figure 6B:
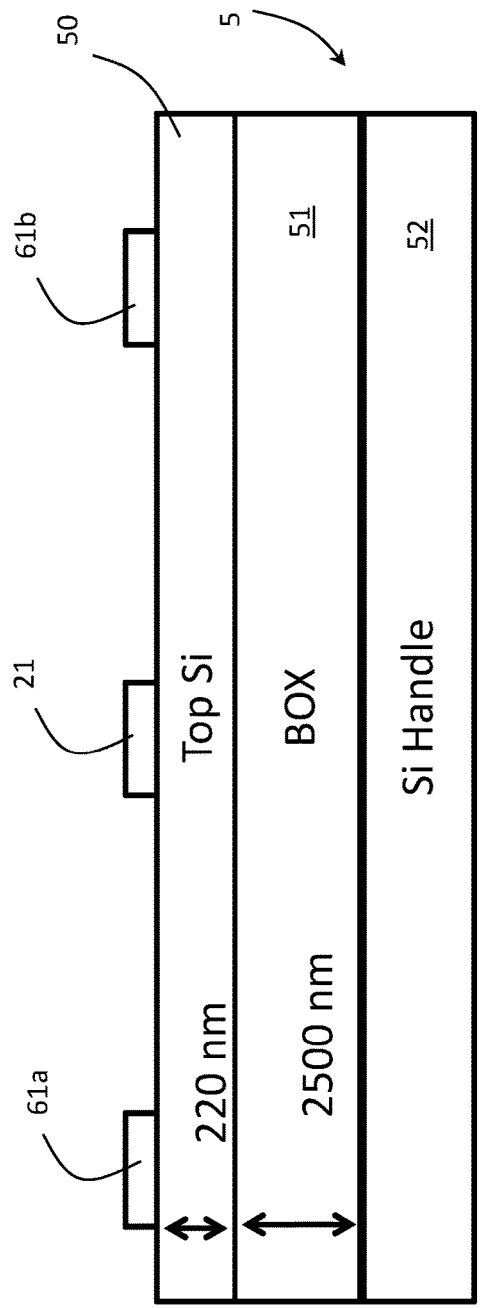

With reference to FIGS. 6a and 6b, the initial step includes providing a layer of waveguide material 50 on the substrate 5. In a preferred embodiment, the substrate 5 includes a dielectric upper cladding layer 51, e.g. silicon dioxide, and a lower handle layer, e.g. silicon. As above, the layer of waveguide material 50 may be between 150 nm and 350 nm thick, preferably about 220 nm thick The next step includes applying an initial protective shield over the portions of the waveguide material layer 50 to be protected during the first etching step, which in this embodiment includes the hard mask layer 21 and hard mask layers 61a and 61b defining other optical devices 62a and 62b on the substrate 5, such as grating couplers, modulators, etc. The hard mask layers 61a and 61b may comprise silicon nitride or any other suitable hard mask material.

Figure 7A:
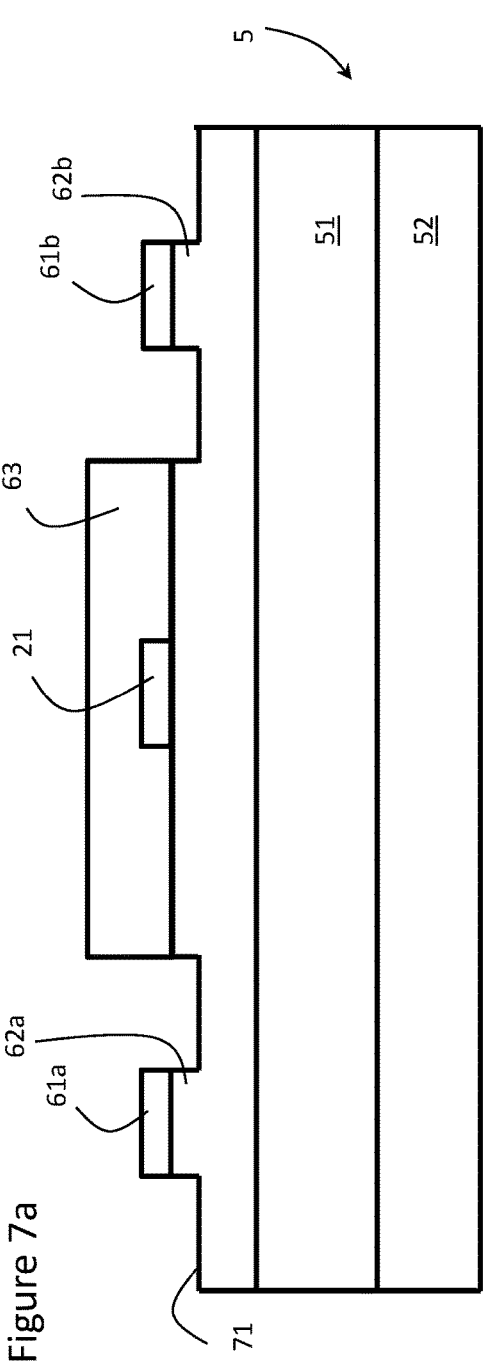
FIGS. 7a and 7b illustrate a second step of the method of FIGS. 6a and 6b.
Figure 7B:
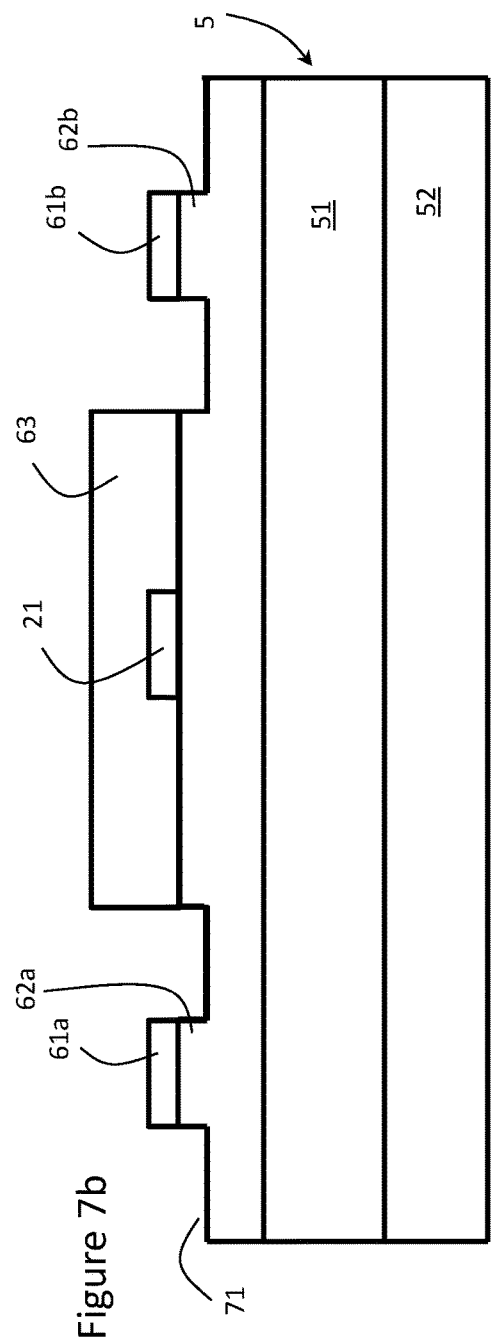

With reference to FIGS. 7a and 7b, the initial step also includes completing the initial protective shield by applying a photoresist layer 63 over the entire optical device 1, so that the other optical devices 62a and 62b may be formed. An initial etch layer is then applied to remove portions of the waveguide material down to a first level 71, e.g. down 50 nm to 75 nm, ideally 60 nm+/−3.5 nm, defining the other optical devices 62a and 62b which extend to the upper level of the waveguide material layer 50.

Figure 8A:
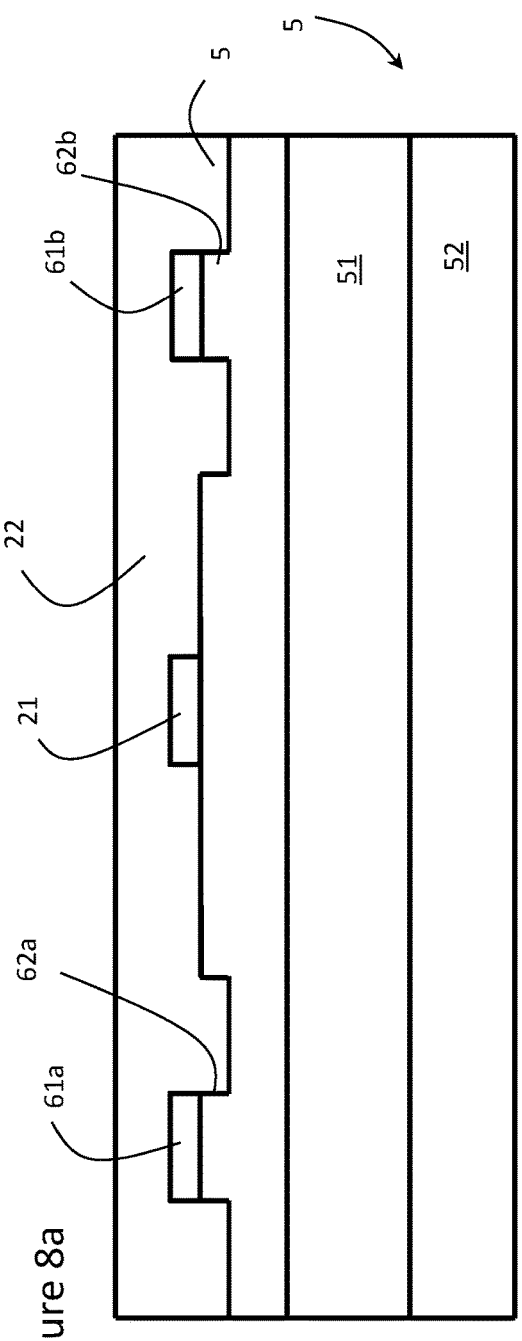
FIGS. 8a and 8b illustrate third and fourth steps of the method of FIGS. 6a and 6b.
Figure 8B:
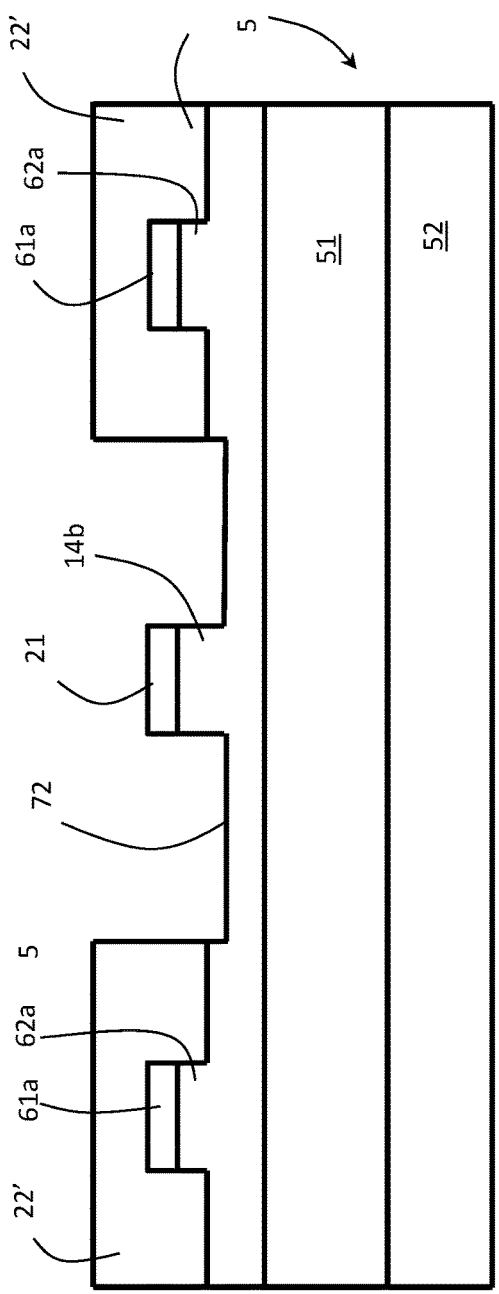

With reference to FIGS. 8a and 8b, the first step in forming the optical device 1 is illustrated. In FIG. 8a, the first protective shield is completed by applying the first photoresist layer 22 over the expansion section 3, the ridge waveguide section 2, and the portion of the hard mask layer 21 extending over those sections, as in FIG. 2. The first photoresist layer 22 may also cover the other optical devices 62a and 62b via first photoresist layer 22'. In FIG. 8b, the partial etch layer 24 is applied over an area including the final side portions 16a and 16b, but also including an area of the waveguide material layer 50 beyond the final side portions. The partial etch layer 24 removes the unprotected portions of the waveguide material layer 50 down to an intermediate level 72. The constant middle portion 14b is protected from the partial etch layer 24 by the hard mask layer 22. The partial etch layer 24 removes the unprotected waveguide material 50 down to the intermediate level, e.g. about half of the height of the waveguide material 50, more than half, 100 nm to 200 nm, or ideally 130 nm+/−3.5 nm, leaving the intermediate level height at about half or less than half of the upper level height, e.g. between 50 nm and 175 nm.

Figure 9A:
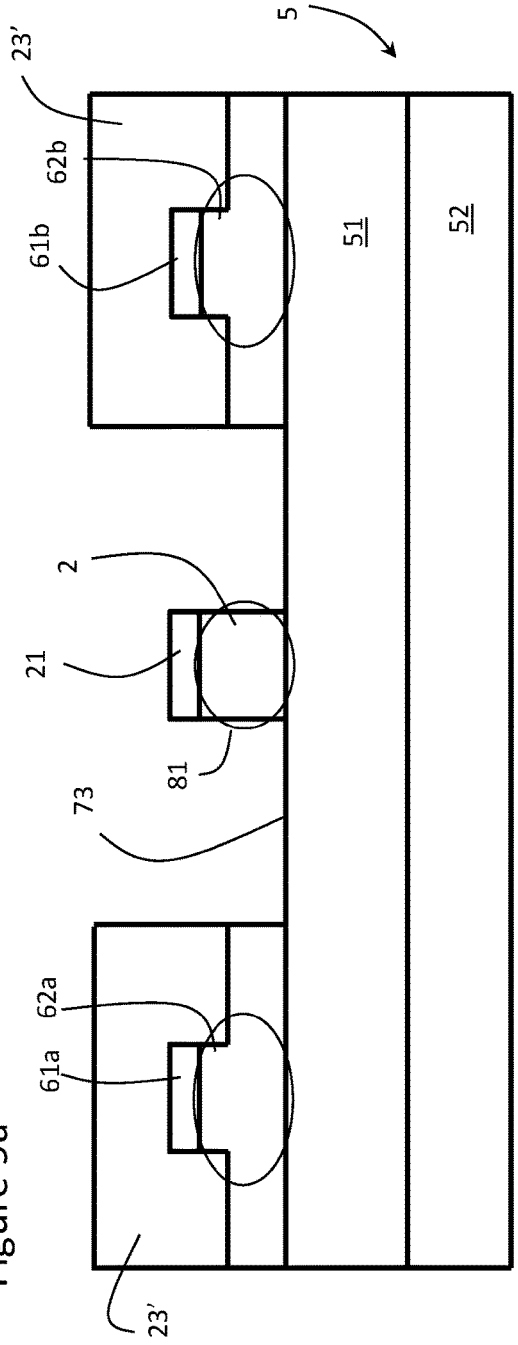
FIGS. 9a and 9b illustrate fifth and sixth steps of the method of FIGS. 6a and 6b.
Figure 9B:
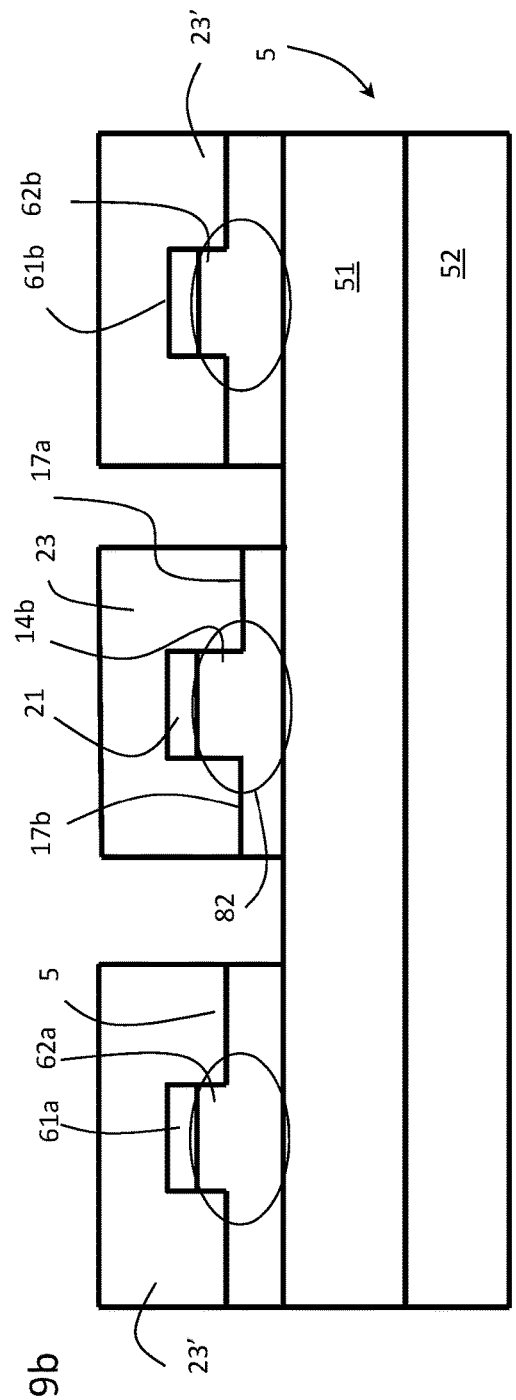

With reference to FIG. 9b, the next step includes applying the second protective shield, including the second photoresist layer 23 over the final side portions 17a and 17b and the constant middle portion 14b, as well as the portion of the hard mask layer 21 over those portions. The second protective shield may also include the second photoresist layer 23' covering the other optical devices 62a and 62b.

The full etch layer 25 is then applied, see FIGS. 9a and 9b, down to the lower level 73, defined by an upper surface of the substrate 5 or some other etch stop layer provide thereon. The full etch step removes the extra waveguide material at the intermediate level 72 from either side of the final side portions 17a and 17b, as well as defining the edges of the ridge waveguide section 2 and the expansion section 3, whereby all of the vertical surfaces of the waveguide material 50 are only subject to a single etch step.

FIGS. 9a and 9b also illustrate mode sizes of the light travelling in the ridge waveguide section 2 and the strip-loaded waveguide region 4, in particular the expansion of the mode side from single mode 81 to a slightly wider single mode 82 then back to a single mode 81. As disclosed, none of the side surfaces of the mode converter 1 that are exposed to the optical mode undergo more than one etching step, only the two edges 12, where the ridge waveguide expansion region 11 meets the tapering middle portion 14a, and where the first and second photoresist layers 22 and 23 intersect, at which points the mode has been only slightly expanded to minimize harmful effects.

Further, in the mode conversion device 1 shown in FIG. 1, the region in which the multiple etches overlap, i.e. the edges 12, is extremely short in the illustrated, on the order of 1 to 2 um in length, and hence the distance over which the interface effects can cause losses is very small. In most other implementations of waveguide manufacturing processes, as noted elsewhere, interface effects would have many mm of waveguide length to build up over.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method of manufacturing a multi-layer optical device on a substrate including a waveguide material thereon, the optical device including: a ridge waveguide section comprising waveguide material extending to an upper level, a strip-loaded ridge waveguide section comprising portions of waveguide material extending to an intermediate level and portions of waveguide material extending to the upper level, and an expansion section between the ridge waveguide section and the strip-loaded ridge waveguide section, the expansion section including a width expanding from the ridge waveguide section to the strip-loaded ridge waveguide section capable of converting an optical mode when propagating between the ridge waveguide section and the strip-loaded ridge waveguide section; wherein the expansion section comprises portions at the upper level and portions at the intermediate level; and the method comprising:
a) providing the substrate with a layer of the waveguide material thereon extending to the upper level;
b) applying a first protective shield over a first area of the waveguide material to define the portions of waveguide material extending to the upper level of the strip-loaded ridge waveguide section, the ridge waveguide section, and the portions of the expansion section at the upper level, while excluding portions of the expansion section at the intermediate level;
c) applying a first partial etch over a second area of the waveguide material, which includes the portions of the strip-loaded ridge waveguide section, which will extend to the intermediate level, to etch the second area wider than the portions of the strip-loaded ridge waveguide section, which will extend to the intermediate level, to form the portions of waveguide material extending to the upper level of the strip-loaded ridge waveguide section;
d) applying a second protective shield over a third area of the waveguide material defining the portions of the waveguide material extending to the intermediate level to protect them from further etching, and the portion of waveguide material extending to the upper level of the strip-loaded ridge waveguide section and the ridge waveguide section; and
e) applying a second full etch, deeper than the first partial etch, over a fourth area of the waveguide material to form the ridge waveguide section and the portions of waveguide material extending to the intermediate level of the strip-loaded ridge waveguide section;
wherein the first protective shield and the second protective shield cover an area of intersection between the ridge waveguide section and the strip-loaded waveguide section, whereby side surfaces of the strip-loaded ridge waveguide section and the ridge waveguide section are only subject to a single etch, except at intersecting edges where the ridge waveguide section intersects the strip-loaded waveguide section.

2. The method according to claim 1, wherein steps b) and d) each include applying a same hard mask layer over the portions at the upper level of the strip-loaded ridge waveguide section and the ridge waveguide section.

3. The method according to claim 2, wherein in step b) the first protective shield also includes a first photoresist layer over the ridge waveguide section, preventing etching material from being applied over the hard mask layer on the ridge waveguide section;
wherein in step d) the second protective shield also includes a second photoresist layer over the strip-loaded ridge waveguide section preventing etching material from being applied over the hard mask layer on the portions of the strip-loaded ridge waveguide section at the upper level;
whereby no part of the hard mask layer is subject to two etching steps.

4. The method according to claim 1, wherein applying the second protective layer comprises applying the second protective shield over the portions of the expansion section at the upper and intermediate levels.

5. The method according to claim 4, wherein the strip-loaded ridge waveguide section comprises:
a middle portion including a height at the upper level and a width substantially the same as the ridge waveguide section; and
at least one side portion including a height at the intermediate level and width that expands outwardly from a side of the middle portion.

6. The method according to claim 5, wherein the expansion section comprises:
a ridge waveguide expansion region including a height at the upper level and a width expanding outwardly from the ridge waveguide section; and
an expanding strip-loaded region including: a tapering middle portion including a height at the upper level and a width tapering down to the middle portion of the strip-loaded ridge waveguide, and expanding side portions including a height at the intermediate level and a width expanding outwardly from each side of the tapering middle portion to meet the side portions of the strip-loaded waveguide section.

7. The method according to claim 6, wherein the first protective shield extends along an edge of the tapering middle portion of the expanding strip-loaded region on either side thereof, thereby defining the expanding side portions of the expansion section at the intermediate level and protecting the ridge waveguide expansion region and the tapering middle portion of the expanding strip-loaded region during the first partial etch.

8. The method according to claim 7, wherein the second protective shield extends along an edge of the expanding strip-loaded region and along an edge of the expanding side portions of the expansion section on either side thereof, thereby defining the expanding strip-loaded region and the expanding side portions of the expansion section during the second full etch.

9. The method according to claim 1, further comprising:
applying a primary protective layer over an area of the waveguide material designated for or including the waveguide device;
applying a secondary protective layer over an area of the waveguide material designate for an additional waveguide feature; and
applying a partial etch around the secondary protective layer to define the additional waveguide features.

* * * * *